(12) United States Patent
Wang et al.

(10) Patent No.: US 9,179,376 B2
(45) Date of Patent: Nov. 3, 2015

(54) RELAY NODE HANDOVER METHOD, BASE STATION, AND COMMUNICATION SYSTEM

(71) Applicant: Huawei Technologies Co., Ltd., Shenzhen, Guangdong (CN)

(72) Inventors: Ke Wang, Shanghai (CN); Yan Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/203,067

(22) Filed: Mar. 10, 2014

(65) Prior Publication Data

US 2014/0194127 A1     Jul. 10, 2014

Related U.S. Application Data

(63) Continuation of application No. PCT/CN2012/081086, filed on Sep. 6, 2012.

(30) Foreign Application Priority Data

Sep. 13, 2011   (CN) .......................... 2011 1 0269656

(51) Int. Cl.
*H04W 36/00*    (2009.01)
*H04W 88/04*    (2009.01)
(Continued)

(52) U.S. Cl.
CPC ...... *H04W 36/0077* (2013.01); *H04W 36/0055* (2013.01); *H04W 88/04* (2013.01); *H04W 36/08* (2013.01); *H04W 40/36* (2013.01); *H04W 84/047* (2013.01)

(58) Field of Classification Search
CPC .................... H04W 36/0077; H04W 36/0055; H04W 40/36; H04W 84/047; H04W 36/08; H04W 36/12; H04W 88/04; H04W 36/0033; H04W 76/02; H04W 36/0016; H04W 48/18; H04W 36/10; H04B 7/14; H04B 7/2606; H04B 7/155
See application file for complete search history.

(56) References Cited

U.S. PATENT DOCUMENTS

2009/0111470 A1    4/2009  Thakare
2009/0290529 A1    11/2009 Toyokawa et al.
(Continued)

FOREIGN PATENT DOCUMENTS

CN    101867985 A    10/2010
CN    101877915 A    11/2010
(Continued)

OTHER PUBLICATIONS

"TP to internal TR on relay architecture options," 3GPP TSG-RAN WG2 #67, Shenzhen, China, R2-095336, 3rd Generation Partnership Project, Valbonne, France (Aug. 24-28, 2009).
(Continued)

*Primary Examiner* — Chuong A Ngo
(74) *Attorney, Agent, or Firm* — Leydig, Voit & Mayer, Ltd.

(57) ABSTRACT

The present invention relates to the field of communications technologies and provides a relay node handover method. The method includes: receiving, by a target base station, a handover request sent by a source base station serving a relay node; acquiring, by the target base station, first transport network layer TNL information from the source base station; and establishing, by the target base station, a connection with the relay node according to the first TNL information. The present invention further provides a base station and a communication system. The present invention may implement the handover of a relay node from a source base station to a target base station, thereby ensuring the establishment of a connection between the relay node and the target base station.

22 Claims, 5 Drawing Sheets

(51) Int. Cl.
*H04W 36/08* (2009.01)
*H04W 84/04* (2009.01)
*H04W 40/36* (2009.01)

(56) References Cited

U.S. PATENT DOCUMENTS

| | | | |
|---|---|---|---|
| 2010/0131663 A1 | 5/2010 | Lee et al. | |
| 2010/0322197 A1* | 12/2010 | Adjakple | H04B 7/155 370/332 |
| 2012/0003962 A1 | 1/2012 | Jeon et al. | |
| 2012/0113887 A1 | 5/2012 | Shen et al. | |
| 2012/0140700 A1 | 6/2012 | Huang | |
| 2013/0322390 A1* | 12/2013 | Xu | H04W 76/02 370/329 |

FOREIGN PATENT DOCUMENTS

| | | |
|---|---|---|
| CN | 101938798 A | 1/2011 |
| CN | 101998554 A | 3/2011 |
| CN | 102083126 A | 6/2011 |
| EP | 2469926 A1 | 6/2012 |
| WO | WO 2010101442 A2 | 9/2010 |
| WO | WO 2011000193 A1 | 1/2011 |
| WO | WO 2011020432 A1 | 2/2011 |

OTHER PUBLICATIONS

Stewart, "Stream Control Transmission Protocol," RFC 4960, pp. 1-152, Standards Track, Network Working Group (Sep. 2007).

"3rd Generation Partnership Project; Technical Specification Group Radio Access Network; Evolved Universal Terrestrial Radio Access Network (E-UTRAN); S1 Application Protocol (S1AP), (Release 10)," 3GPP TS 36.413, Version 10.0.0, 3rd Generation Partnership Project, Valbonne, France (Dec. 2010).

"3rd Generation Partnership Project; Technical Specification Group Radio Access Network; Evolved Universal Terrestrial Radio Access Network (E-UTRAN); X2 application protocol (X2AP), (Release 10)," 3GPP TS 36.423, Version 10.0.0, 3rd Generation Partnership Project, Valbonne, France (Dec. 2010).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 10)," 3GPP TS 36.300, Version 10.0.0, 3rd Generation Partnership Project, Valbonne, France (Jun. 2010).

* cited by examiner

RELAY NODE HANDOVER METHOD, BASE STATION, AND COMMUNICATION SYSTEM

CROSS-REFERENCE TO RELATED APPLICATIONS

This application is a continuation of International Patent Application No. PCT/CN2012/081086, filed on Sep. 6, 2012, which claims priority to Chinese Patent Application No. 201110269656.X, filed on Sep. 13, 2011, both of which are hereby incorporated by reference in their entireties.

FIELD OF THE INVENTION

The present invention relates to the field of communications technologies, and in particular, to a relay node handover method, a base station, and a communication system.

BACKGROUND OF THE INVENTION

In a conventional network, a wireless connection between a base station and a user equipment (UE for short) is a direct wireless connection, that is, a single-hop network connection. A relay technology is to add one or more relay nodes (RNs for short) between the base station and the UE, where the relay node is configured to perform signal forwarding once or multiple times on a wireless signal sent by the base station before the wireless signal reaches the UE. When an RN is provided between a base station and a UE, the base station may be referred to as a donor eNB (DeNB for short), and the base station also controls the RN. By taking simple two-hop relay network architecture as an example, a wireless link between a base station and a UE is separated into two wireless links, namely, one from the base station to an RN, and one from the RN to the UE, so as to obtain a higher link capacity and better coverage. The wireless link from the base station to the RN may be referred to as a backhaul link, whereas the wireless link from the RN to the UE is referred to as an access link.

At present, the industry is looking for an effective implementation manner for handover an RN among multiple base stations when the RN moves.

SUMMARY OF THE INVENTION

The present invention provides a relay node handover method, a base station and a communication system, so as to solve the problem of handover a relay node from a source base station to a target base station when the relay node moves.

In one aspect, the present invention provides a relay node handover method, including:
  receiving, by a target base station, a handover request sent by a source base station serving a relay node;
  acquiring, by the target base station, first transport network layer TNL information from the source base station; and
  establishing, by the target base station, a connection with the relay node according to the first TNL information.

In another aspect, the present invention provides a base station, including:
  a processor, configured to decide to switch a relay node served by the base station to a target base station; and
  a transmitter, configured to send a handover request and first transport network layer TNL information to the target base station, so that the target base station establishes a connection with the relay node according to the first TNL information.

In another aspect, the present invention provides a base station, including:
  a receiver, configured to receive a handover request sent by a source base station serving a relay node and first transport network layer TNL information; and
  a processor, configured to establish a connection with the relay node according to the first TNL information.

In still another aspect, the present invention provides a communication system, including:
  a target base station, where the target base station may implement the actions executed by the target base station in the above relay node handover method; and
  a source base station, where the source base station may implement the actions executed by the source base station in the above relay node handover method.

For a scenario in which a relay node moves, in the present invention, the relay node is handed over from the source base station to the target base station via TNL information being transmitted from the source base station to the target base station, thereby ensuring the establishment of a connection between the relay node and the target base station.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF THE EMBODIMENTS

To make objectives, technical solutions, and advantages of embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood by a person skilled in the art that the accompanying drawings are merely schematic diagrams of a preferred embodiment, and modules or processes in the accompanying drawings are not necessarily required for implementing the present invention.

The present document describes various aspects with reference to a terminal and/or a base station.

The terminal refers to a device providing voice and/or data connectivity for a user, and includes a wireless terminal or a wired terminal. The wireless terminal may be a handheld device with a wireless connection function or another mobile device that is connected to a wireless modem, communicating with one or more core networks through a radio access network. For example, the wireless terminal may be a mobile phone (or referred to as a "cellular" phone) or a computer with a mobile terminal. For another example, the wireless terminal may be a portable, pocket, handheld, computer-embedded, or vehicle-mounted mobile apparatus. For still another example, the wireless terminal may be a mobile station, an access point, a user equipment (UE for short), or the like. For ease of description, in each embodiment of the present invention, the UE is taken as an example for description.

The base station may be a device that communicates with the wireless terminal through one or more cells on an air interface in an access network. For example, the base station may be a base transceiver station (BTS for short) in the GSM or CDMA, may be a NodeB in the WCDMA, may be an evolved NodeB (evolutional Node B, eNB or e-NodeB for short) in the LTE, or may be a base station in a subsequently evolved network, which is not limited in the present invention.

Further, the terms "system" and "network" in this document may always be exchanged for use in this document. The term "and/or" in this document is only an association relationship for describing associated objects, and represents that three relationships may exist, for example, A and/or B may represent the following three cases: A exists separately, both A and B exist, and B exists separately. In addition, the character "/" in this document usually represents that the former and later associated objects are in an "or" relationship.

Figure 1:
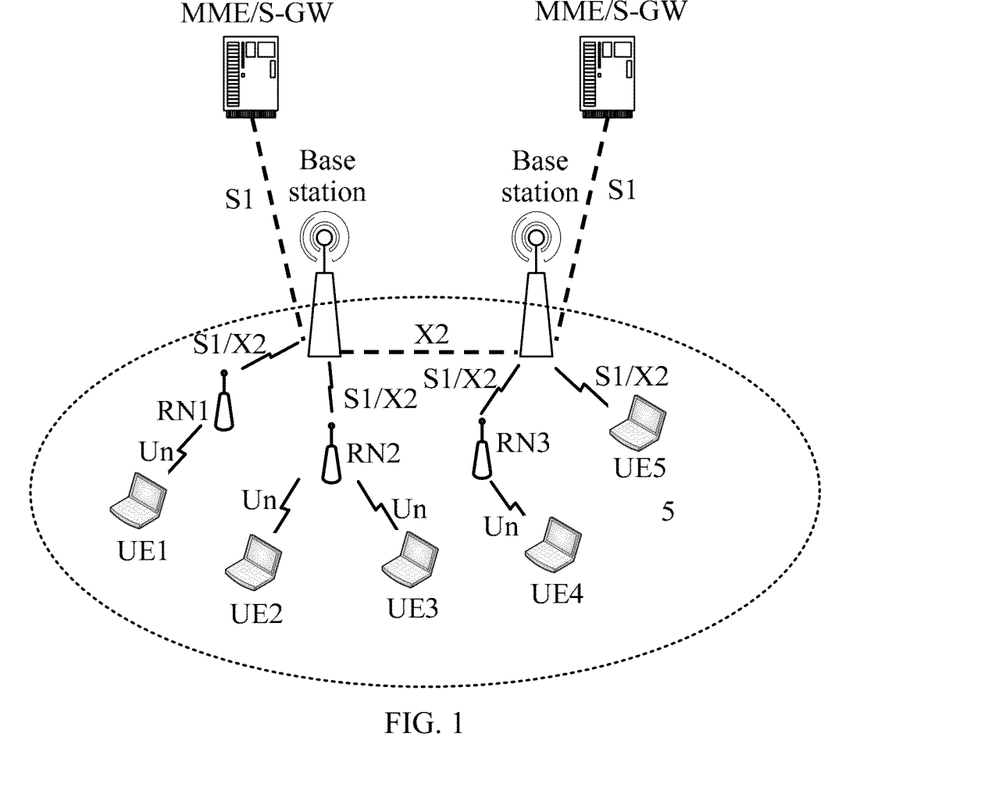
FIG. 1 is a schematic diagram of a network scenario having a relay node in the present invention.

Network scenarios of different embodiments of the present invention may be applied to a communication network including at least one relay node. For ease of convenience, the present invention being applied to two-hop relay network architecture is taken as an example, and an embodiment of the present invention may also be applied to multi-hop relay network architecture. As shown in FIG. 1, each of relay nodes RNs (RN1 to RN3) access a network through one of two base stations, the UEs (UE1 to UE4) are attached to the RNs (RN1 to RN3), and UE5 is directly attached to a base station. In the process that an RN accesses a network, the RN may establish a connection with a mobile management entity (MME for short), so as to transport control signaling. At the same time, the RN may also establish a connection with a service gateway (S-GW for short), so as to transport user plane data. A person skilled in the art should understand that, the base station may be a macro base station or a micro base station, but each embodiment of the present invention is not limited thereto.

Figure 2:
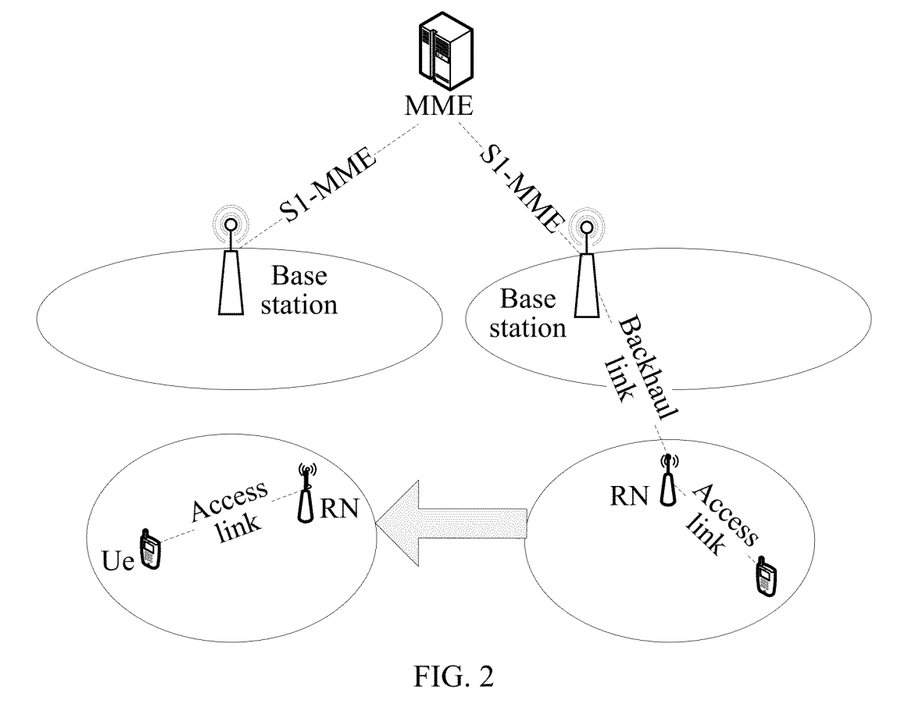
FIG. 2 is a schematic diagram of another network scenario having a relay node in the present invention.

Network scenarios of different embodiments of the present invention are shown in FIG. 2. An interface between each base station and a UE and an interface between an RN and a UE are both air interfaces (Un interfaces for short). A Un interface is mainly configured to transmit control plane signaling and user plane data. By taking an LTE technology as an example, base stations may be connected through an X2 interface. After an RN is introduced, an S1/X2 interface is provided between an RN and a base station, and therefore, the base station provides an agent function for an S1/X2 interface between the RN and another network node.

For an RN, an air interface protocol stack includes two layers, namely, an access stratum (AS for short) and a transport network layer (TNL for short). The AS layer includes: a physical layer (PHY for short), media access control (MAC for short), radio link control (RLC for short), and a packet data convergence protocol (PDCP for short). The TNL layer is formed by one or more protocol layers in the following: IP, a stream control transmission protocol (SCTP for short), and a user datagram protocol (UDP for short).

For example, in the scenarios shown in FIG. 1 and FIG. 2, specifically, the S1/X2 interfaces are all borne over corresponding TNLs, where the user plane data of an S1/X2 interface is borne over UDP/IP, and the control plane signaling of an S1/X2 interface is borne over SCTP/IP.

The UDP is a non-connection-based transport layer protocol, that is to say, between an RN and a source base station, or between an RN and a target base station, the transmission of user plane data based on the UDP does not need a set communication channel or path. Therefore, when an RN is switched to a target base station, a connection does not need to be reestablished for the UDP between the target base station and the RN.

The SCTP is a connection-based transport layer protocol, that is to say, between an RN and a source base station, or between an RN and a target base station, the transmission of control signaling based on the SCTP requires a preset communication channel or path. That means, when an RN is switched to a target base station, a communication channel or path between the RN and the target base station needs to be reestablished. In this embodiment, the communication channel may be an SCTP association. A person skilled in the art may understand that, the SCTP association refers to a logic connection or path between two SCTP endpoints for data transmission established through a four-step handshake mechanism made by an SCTP protocol, and details are not described herein again.

Figure 3:
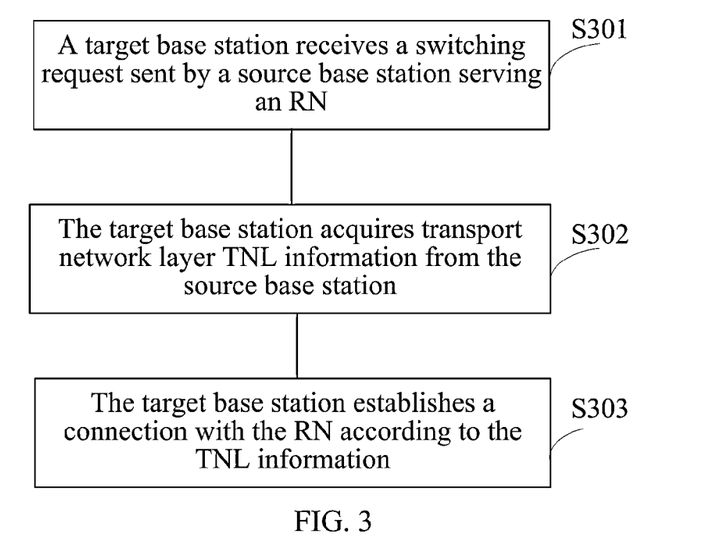
FIG. 3 is a schematic flow chart of a relay node handover method in Embodiment 1 of the present invention.

An RN handover method provided in Embodiment 1 of the present invention is shown in FIG. 3, and includes:

S301: A target base station receives a handover request sent by a source base station serving an RN.

S302: The target base station acquires transport network layer TNT, information from the source base station.

S303: The target base station establishes a connection with the RN according to the TNT, information.

In S301, optionally, when the RN provides the handover request to the source base station during movement, the source base station may confirm the target base station according to a measurement report reported by the RN and sends the handover request to the target base station to switch the RN. Optionally, the source base station may also actively confirm the target base station according to the load condition of a cell, and sends the handover request to the target base station to switch the RN.

In S302, the TNT, information may be SCTP association information and/or user plane transport address information. The SCTP association information includes one or more pieces of the following information:

a transport address list of a control plane of the RN;

a transport address list of a control plane of the source base station; and the primary path Address between the RN and the source base station.

The transport address list of the control plane of the RN has at least one piece of control plane transport address information of the RN. For example, the transport address information may be an IP address of the control plane of the RN, an SCTP port address of the RN or a combination of the two. A person skilled in the art may understand that, the transport address of the control plane may be a route for sending a data packet based on the control plane or another address for transmitting control plane signaling of the RN, and details are not described herein again.

The transport address list of the control plane of the source base station has at least one piece of control plane transport address information of the source base station. For example, the transport address information may be an IP address of the control plane of the source base station, an SCTP port address of the source base station or a combination of the two. A person skilled in the art may understand that, the transport address of the control plane may be a route for sending a data packet based on the control plane, or may be another address for transmitting the RN control plane signaling, and details are not described herein again.

The primary path Address (primary path IP address) is a path address for transmitting control plane signaling between a source base station and an RN, and includes a control plane transport address selected from the transport address list of the control plane of the RN, and/or a control plane transport address selected from the transport address list of the control plane of the source base station. Based on the path address, control plane signaling may be transmitted between the source base station and the RN on the SCTP association.

In this embodiment, for example, the target base station may acquire the transport address of the control plane of the RN and the transport address of the control plane of the source base station from the transport address list of the control plane of the RN and the transport address list of the control plane of the source base station, respectively, and establishes a connection between the target base station and the RN based on the transport addresses. For another example, the target base station may also directly use the acquired primary path Address of the RN and the source base station, and establish a connection between the target base station and the RN based on the primary path Address. At this time, a transport address of another control plane in the transport address list of the control plane of the RN and/or the transport address list of the control plane of the source base station acquired by the target base station may be served as a secondary path Address between the target base station and the RN, which is used for handover a primary path, which is for transmitting SCTP control plane signaling between the base station and the RN, to a secondary path, when control plane signaling fails to be transmitted on the primary path.

In this embodiment, the user plane transport address information is user plane transport address information of the source base station and the RN. For example, the transport address information of the user plane may be the IP addresses of the user planes of the source base station and the RN, the port addresses of the user planes of the source base station and the RN or a combination of the two. A person skilled in the art may understand that, the transport address of the user plane may be a route for sending a data packet based on the control plane or another address for transmitting the user plane data between the source base station and the RN, and details are not described herein again. And a person skilled in the art may also understand that, the control plane transport address and the user plane transport address of the RN may be the same or different; and similarly, the control plane transport address and the user plane transport address of the source base station may also be the same or different, which are not limited in the present invention.

In this embodiment, optionally, the source base station may send the TNL information to the target base station by carrying it in the handover request. Optionally, the source base station may also send the TNL information to the target base station by carrying it in other messages or information elements. For example, the source base station may send the TNL information to the target base station by carrying it in a sequence number state transport message. Alternatively, the source base station may also send a single message or information element to the target base station, where the message or information element carries the TNL information, which is not limited in the present invention.

In S303, after the RN accesses a cell of the target base station, the target base station or the RN establishes a TNL connection between the target base station and the RN according to the TNL information, including establishing the SCTP association between the target base station and the RN and/or a user plane connection between the target base station and the RN. That the RN accesses the cell of the target base station refers to that the RN randomly accesses a cell under the target base station, and in the cell, the RN may receive scheduling information of the target base station.

Optionally, when the TNL information is SCTP association information and the RN accesses the cell of the target base station, the target base station or the RN may immediately initiate a connection between the target base station and the RN. Specifically, the target base station or the RN may transfer, according to the TNL information, for example, according to the primary path Address of the RN and the source base station, the primary path between the source base station and the RN to the path between the target base station and the RN, so that the target base station is connected to the RN through a first primary path.

In this embodiment, before establishing the SCTP association between the target base station and the RN, the target base station may perform configuration at the target base station side. A person skilled in the art may understand that, the configuration at the target base station side may be configuration of a data structure on a protocol stack SCTP performed according to the SCTP association information at the target base station side, and details are not described herein again.

In this embodiment, the SCTP association information used by the target base station for configuration performed at the target base station side, may further include, but not limited to, the following parameters:

an error count, used for indicating a current error count for the transport to the target base station; and an error threshold, used for indicating a current error threshold corresponding to the target base station. For example, when the error count exceeds the error threshold, it is considered that the control plane transport address of the SCTP association fails to be transmitted to the target base station.

A person skilled in the art may understand that, the parameters of the SCTP association information used by the target base station for configuration are not limited thereto, and may be any parameter that enables the target base station to correctly acquire an SCTP connection state between the source base station and the RN, and to implement synchronization of the RN from the source base station to the target base station according to the SCTP connection state, and details are not described herein again.

Optionally, when the TNT, information is user plane transport address information, after the RN accesses the cell of the target base station and when the RN or the target base station transmits data to a peer end, the target base station or the RN is triggered to initiate a connection between the target base station and the RN.

In this embodiment, for a scenario in which an RN moves, configuration at a target base station side is performed according to TNT, information transmitted by a source base station to a target base station, so as to implement the handover of the RN from the source base station to the target base station, thereby ensuring the establishment of a connection between the RN and the target base station.

Figure 4:
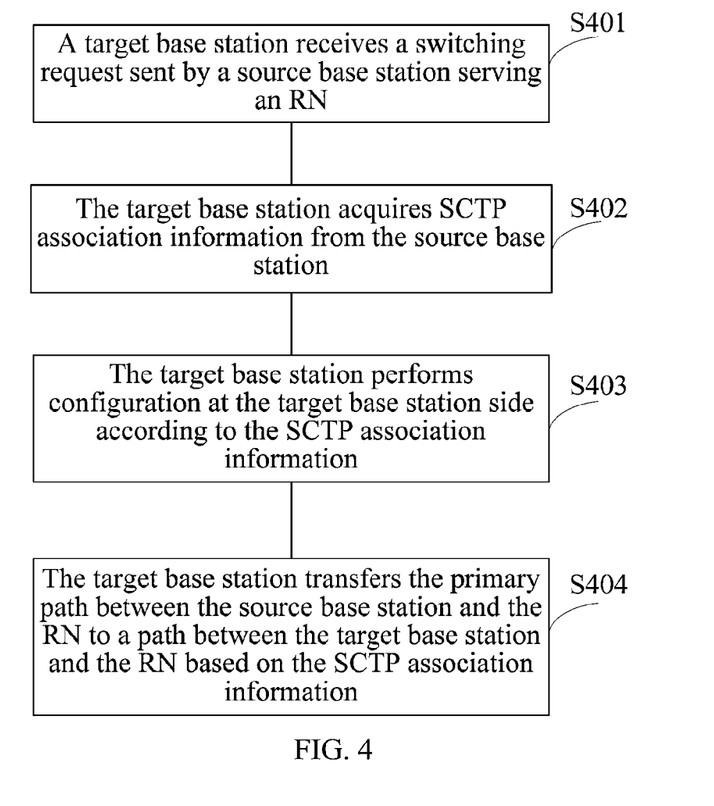
FIG. 4 is a schematic flow chart of a relay node handover method in Embodiment 2 of the present invention.

The RN handover method in Embodiment 2 of the present invention is shown in FIG. 4, and includes:

S401: A target base station receives a handover request sent by a source base station serving an RN.

Reference may be made to the related description in Embodiment 1 for S401, and details are not described herein again.

S402: The target base station acquires SCTP association information from the source base station.

In this embodiment, reference may be made to the related description in Embodiment 1 for the SCTP association information, and details are not described herein again.

In this embodiment, the SCTP association information and user plane transport address information of the RN, the target base station, and the source base station may keep unchanged through pre-configuration. For example, through defining the SCTP association information and user plane transport address information of the RN, the target base station, and the source base station by operators, the SCTP association keeps unchanged.

In this embodiment, an X2/S1 interface is provided between the source base station and the RN, and the X2/S1 interface corresponds to two independent SCTP associations. Therefore, the SCTP association information transmitted by the source base station to the target base station includes two independent SCTP associations corresponding to the X2/S1 interface.

S403: The target base station performs configuration at the target base station side according to the SCTP association information.

In this embodiment, through pre-configuration or defining by the operators, it is determined that the SCTP association information and user plane transport addresses of the RN, the target base station, and the source base station keep unchanged. The source base station does not need to send a user plane transport address to the target base station, but only needs to send the SCTP association information at the source base station side to the target base station, so that the target base station correctly acquires an SCTP connection state between the source base station and the RN, and implements synchronization of the RN from the source base station to the target base station according to the SCTP connection state.

Optionally, in order to ensure that the SCTP connection state between the base station and the RN keeps unchanged during the handover, when the target base station performs configuration at the target base station side, or before the RN is successfully switched to the target base station, information transmission on a primary path may be stopped, for example, transmission of information relevant to a heartbeat mechanism is stopped.

S404: After the RN accesses a cell of the target base station, the target base station transfers the primary path between the source base station and the RN to a path between the target base station and the RN based on the SCTP association information, so as to implement the establishment of a connection between the RN and the target base station.

In this embodiment, the target base station implements the connection between the target base station and the RN according to a primary path Address in the SCTP association information and through a triggering mechanism, so as to restore an SCTP association and the transmission of control plane signaling borne over the SCTP association.

In this embodiment, for the triggering mechanism, by transmitting the control plane signaling which needs to be borne over the SCTP association, that a peer end is implicitly notified that the connectivity of the SCTP association is restored. A person skilled in the art may understand that, an initiator of transporting the control plane signaling may be the RN or the target base station, and correspondingly, a receiver is the target base station or the RN, which is not limited in the present invention. For example, when the target base station sends the control plane signaling on the SCTP association to the RN at the primary path based on the primary path Address, and the RN can receive the control plane signaling, it indicates that the SCTP association between the target base station and the RN is established. For another example, when the target base station sends the control plane signaling on the SCTP association to the RN at the primary path, and the RN cannot receive the control plane signaling, it indicates that the SCTP association between the target base station and the RN is not established.

In this embodiment, for a scenario in which an RN moves, when the RN is switched from a source base station to a target base station, as long as the SCTP association state information of the source base station and the RN is transmitted to the target base station in advance during the preparation of handover, the SCTP association state on a Un interface may not be affected.

Figure 5:
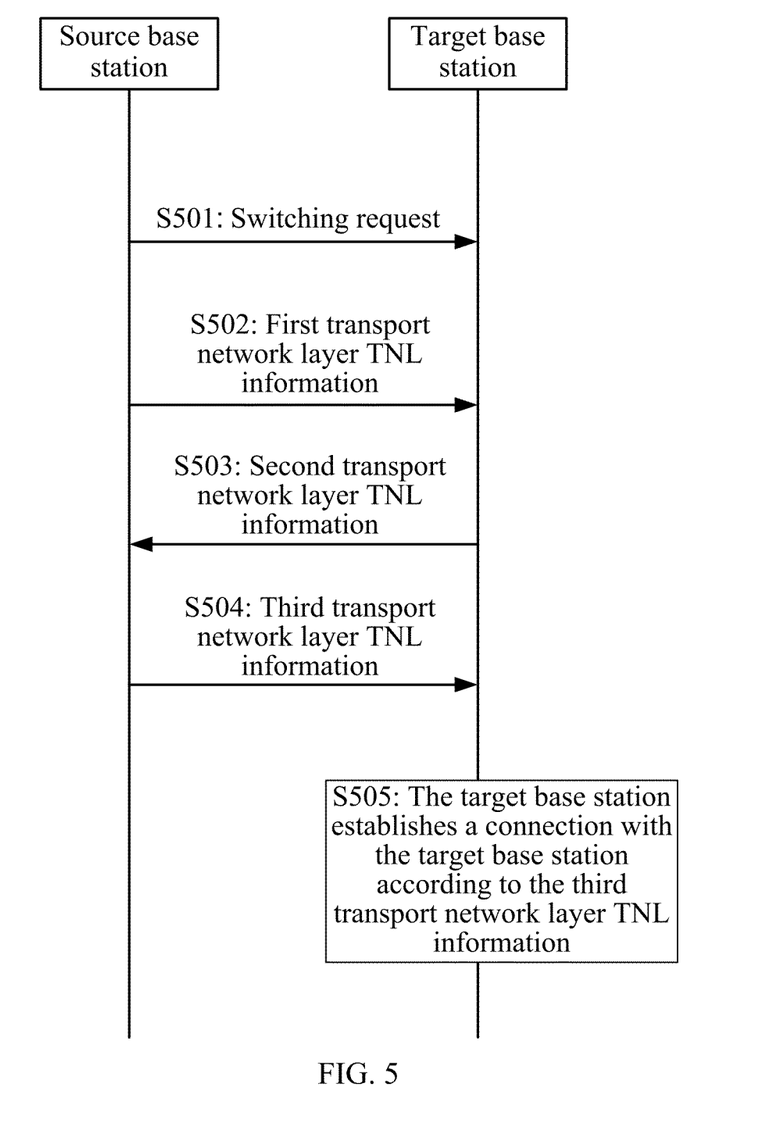
FIG. 5 is a schematic flow chart of a relay node handover method in Embodiment 3 of the present invention.

An RN handover method provided in Embodiment 3 of the present invention is shown in FIG. 5, and includes:

S501: A source base station serving an RN sends a handover request to a target base station.

Reference may be made to the related description in Embodiment 1 for S501, and details are not described herein again.

S502: The source base station sends first transport network layer TNT, information to the target base station.

In this embodiment, the first TNT, information includes first SCTP association information and/or first user plane transport address information. Reference may be made to the description relevant to the SCTP association information and/or the user plane transport address information in Embodiment 1 for the first SCTP association information and/or the first user plane transport address information, and details are not described herein again.

In this embodiment, according to a measurement report reported by the RN to the source base station, the source base station may decide whether to switch the RN to the target base station, and send the first TNL information to the target base station. A person skilled in the art may understand that, the source base station may also decide by itself whether to switch the RN to the target base station, and send the first TNL information to the target base station, and details are not limited in the present invention.

S503: The target base station sends second transport network layer TNL information to the source base station according to the first transport network layer TNL information.

In this embodiment, when an SCTP association of any one of the RN, the target base station, and the source base station, or a user plane transport address of any one of the RN, the target base station, and the source base station is changed, that is to say, when at least one of a transport address list of a control plane of the RN, a transport address list of a control plane of the source base station, a transport address list of a control plane of the target base station, and the primary path Address of the RN and the source base station is changed, or, at least one of the user plane transport addresses of the source base station and the RN is changed, the target base station sends the second TNL information to the source base station according to the first TNL information.

In this embodiment, the second TNL information includes second SCTP association information and/or second user plane transport address information. The second SCTP association information is configured by the target base station, and includes one or more pieces of the following information:

the transport address list of the control plane of the RN;

the transport address list of the control plane of the source base station;

the transport address list of the control plane of the target base station; and the second primary path Address of the RN and the source base station.

In this embodiment, when the transport address of the control plane of the RN and the transport address of the control plane of the source base station are unavailable, the target base station may configure the second SCTP association information, and send the updated second SCTP association information to the source base station. For example, when the source base station transmits the current SCTP association information of the source base station/RN to the target base station, and according to local configuration at the target base station side, the target base station finds that any control plane transport address of the RN/source base station has a conflict with the transport address used at a target side, or finds that any control plane transport address of the RN/source base station fails to be used in a local transport network configured at the target side (for example, any control plane transport address of the RN/source base station and the transport address used at the target side are not addresses in a same IP subnet), the target base station sends the updated second SCTP association information to the source base station. A person skilled in the art may understand that, that the target base station configures the second SCTP association information may be that the target base station reconfigures the second SCTP association information according to an actual condition, or may be that the target base station selects an existing parameter to update the second SCTP information, which is not limited in the present invention.

In this embodiment, the second user plane transport address information transmitted by the target base station to the source base station is the user plane transport address between the source base station and the RN, where the user plane transport address is configured by the target base station and confirmed by the source base station. For example, when the source base station transmits the current user plane transport address between the source base station and the RN to the target base station, and according to local configuration at the target base station side, the target base station finds that the user plane transport address of the source base station/RN is unavailable (for example, when any user plane transport address of the RN/source base station has a conflict with the transport address used at the target side, or when any user plane transport address of the RN/source base station fails to be used in the local transport network configured at the target side), the target base station sends the updated user plane transport address of the source base station and/or RN to the source base station.

In this embodiment, according to the first TNL information, the target base station may send, to the source base station, a handover request confirmation message indicating that the second TNL information exists. As described above, if the target base station confirms that the first TNL information cannot be used any longer and the target base station needs to send updated TNL information to the source base station, corresponding indication may be made to the source base station through the handover request confirmation message, and the second TNL information is transferred to the source base station.

In this embodiment, after the target base station transmits the SCTP association information and/or the user plane transport address information to the source base station, the RN fails to directly receive data sent by the target base station, and therefore, the data received by the RN is forwarded by the source base station. For example, after the source base station receives the second TNL information sent by the target base station, the source base station sends, to the RN, an S1 message or an RRC message indicating that the second TNL information exists. For example, the S1 message may be a message bearing control plane signaling of an S1 interface, for example, a message bearing S1AP signaling; the RRC message may be an RRC connection reconfiguration message or an RRC downlink transport message. A transparent container or an information element used for indicating the second TNL information may be added in the S1 message or the RRC connection reconfiguration message, is used for carrying the updated SCTP association information and/or the updated user plane transport address.

S504: The source base station sends third transport network layer TNL information to the target base station according to the second transport network layer TNL information.

In this embodiment, the source base station adds, according to an updated control plane transport address and/or a second primary path Address, a second primary path between the RN and the source base station, which is used for an SCTP association when the RN is switched to the target base station. At this time, the SCTP association for transporting control plane signaling between the source base station and the RN is still a first primary path, that is to say, the control plane signaling is still transported at the first primary path.

In this embodiment, the third TNL information is third SCTP association information and/or second user plane transport address information. The third SCTP association information is confirmed by the source base station, and includes one or more types of the following information:

the transport address list of the control plane of the RN;

the transport address list of the control plane of the source base station; and the second primary path Address of the source base station and the RN.

In this embodiment, a person skilled in the art may understand that, the transport address list of the control plane of the RN in the third SCTP association information and the transport address list of the control plane of the RN in the second SCTP association information may be the same or different. Similarly, the transport address list of the control plane of the source base station in the third SCTP association information and the transport address list of the control plane of the source base station in the second SCTP association information may be the same or different, which is not limited in the present invention.

In this embodiment, the target base station receives a sequence number state transport message which includes the third TNL information and is sent by the source base station according to the second TNL information. For example, the sequence number state transport message may be a synchronous state transport message. As described above, after the RN and the source base station have updated the SCTP association and/or the user plane transport address, the updated SCTP association state information and/or user plane transport address information needs to be notified to the target base station, and therefore, the synchronous state transport message may be used to transmit the third TNL information. For example, a transparent container or signaling for indicating a third TNL connection state may be added in the synchronous state transport message, and is used to carry the updated SCTP association information and/or user plane transport address information.

S505: The target base station establishes a connection with the target base station according to the third transport network layer TNL information.

Optionally, the target base station establishes a connection with the RN based on the second user plane transport address information.

Optionally, after the RN accesses a cell of the target base station, the target base station transfers the second primary path between the source base station and the RN to a path between the target base station and the RN based on the third SCTP association information, so that the target base station is connected to the RN through the second primary path.

Optionally, the target base station switches, according to the third SCTP association information, the transmission of the control plane signaling from the first primary path to the second primary path, and establishes a connection between the target base station and the RN through the second primary path.

In this embodiment, the handover of the control plane signaling between the first primary path and the second primary path may include the following two manners 1. Before transferring the second primary path between the source base station and the RN to a path between the target base station and the RN, the source base station may switch communication information transmitted at the first primary path based on the first primary path Address (in this embodiment, the communication information may be control plane signaling) to the second primary path based on the second primary path Address for transmission. Subsequently, the source base station deletes the first primary path.

2. The target base station firstly transfers the first primary path and the second primary path between the RN and the source base station to a path between the RN and the target base station. Subsequently, the target base station switches the communication information transmitted at the first primary path based on the first primary path Address to the second primary path based on the second primary path Address for transmission, and deletes the first primary path.

Optionally, in order to ensure that the SCTP connection state between the base station and the RN keeps unchanged during the handover, when the target base station performs configuration at the target base station side, for example, configuration of a protocol stack, or before the RN is successfully switched to the target base station, information transmission at the first primary path or the second primary path may be stopped, for example, transmission of information relevant to a heartbeat mechanism is stopped.

Therefore, in this embodiment, for a scenario in which an RN moves, if the SCTP association of the source base station/target base station/RN, or the user plane transport address of the source base station/RN needs to be updated, after the target base station sends, to the source base station, the second TNT, information configured by the target base station, the source base station sends, to the target base station, the third TNT, information confirmed by the source base station, to implement the handover of the RN from the source base station to the target base station, thereby ensuring the establishment of a connection between the RN and the target base station.

A person of ordinary skill in the art may understand that all or a part of the steps of the methods in the embodiments may be implemented by a program instructing relevant hardware. The program may be stored in a computer readable storage medium. When the program is run, the above steps of the methods in the embodiments are performed. The storage medium may be any medium capable of storing program codes, such as a ROM, a RAM, a magnetic disk or an optical disk.

Figure 6:
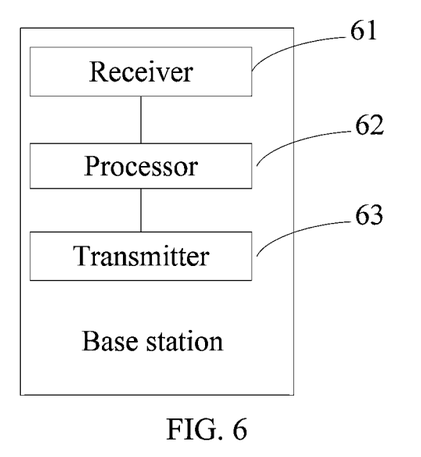
FIG. 6 is a schematic structural diagram of a base station in Embodiment 4 of the present invention.

Embodiment 4 of the present invention provides a base station, where with reference to FIG. 6, the main structure of the base station includes:

a receiver 61, configured to receive a handover request sent by a source base station serving an RN and first transport network layer TNT, information; and a processor 62, configured to establish a connection with the RN according to the first TNT, information.

If at least one control plane transport address of a control plane transport address of the source base station and a control plane transport address of the relay node is unavailable, and/or at least one user plane transport address of a user plane transport address of the source base station, and a user plane transport address of the relay node is unavailable, the processor 82 is further configured to configure second TNT, information, where the second TNT, information includes second SCTP association information and/or second user plane transport address information.

The base station further includes a transmitter 63, configured to send the second TNT, information to the source base station according to the first TNT, information.

The receiver 61 is further configured to receive third TNT, information that is sent by the source base station according to the second TNT, information, where the third TNT, information is confirmed by the source base station.

The base station may implement actions executed by the target base station in the RN handover method in Embodiments 1 to 3. For example, the receiver 61 may execute the action of S101 in Embodiment 1. Therefore, in this embodiment, for a scenario in which an RN moves, the handover of the RN from a source base station to a target base station is implemented, thereby ensuring the establishment of a connection between the RN and the target base station.

Figure 7:
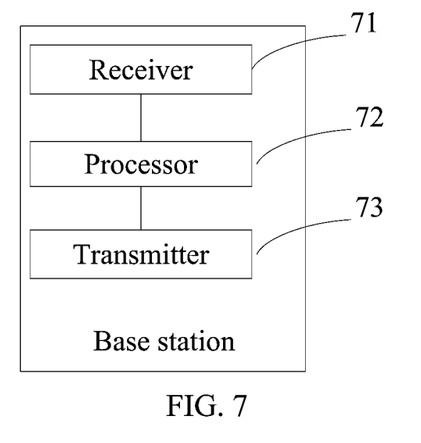
FIG. 7 is a schematic structural diagram of a base station in Embodiment 5 of the present invention.

Embodiment 5 of the present invention provides a base station, where with reference to FIG. 7, the main structure of the base station includes:

a processor 71, configured to decide to switch an RN served by the base station to a target base station; and a transmitter 72, configured to send a handover request and first TNT, information to the target base station, so that the target base station establishes a connection with the RN according to the first TNT, information.

The first TNL information includes: first stream control transmission protocol SCTP association information and/or first user plane transport address information.

The first SCTP association information includes at least one type of the following information:

a transport address list of a control plane of the RN;

a transport address list of a control plane of the base station; and a first primary path Address of the RN and the base station.

The base station further includes a receiver 73, configured to: when the target base station confirms that at least one control plane transport address of the control plane transport address of the base station and the control plane transport address of the RN is unavailable, and/or at least one user plane transport address of the user plane transport address of the base station and the user plane transport address of the RN is unavailable, receive second TNT, information that is sent by the target base station to the base station according to the first TNT, information, where the second TNT, information includes second SCTP association information and/or second user plane transport address information configured by the target base station.

The transmitter 72 is further configured to send third TNT, information to the target base station according to the second TNT, information, where the third TNT, information includes third SCTP association information confirmed by the base station and/or second user plane transport address information.

The second SCTP association information configured by the target base station includes at least one type of the following information:

the transport address list of the control plane of the RN;
the transport address list of the control plane of the base station;
the transport address list of the control plane of the target base station; and
the second primary path Address of the RN and the base station.

The third SCTP association information confirmed by the base station includes at least one type of the following information:

the transport address list of the control plane of the RN;
the transport address list of the control plane of the base station; and
the second primary path Address of the RN and the base station.

The processor 71 is further configured to confirm the third SCTP association information and/or second user plane transport address information.

The transmitter 72 is further configured to send an S1 message or a radio resource control RRC message to the RN, where the S1 message or the RRC message includes the second TNT, information.

The base station may implement actions executed by the source base station in the RN handover method in Embodiments 1 to 3. For example, the transmitter 72 may execute the action of S501 in Embodiment 3. Therefore, in this embodiment, for a scenario in which an RN moves, the handover of the RN from a source base station to a target base station is implemented, thereby ensuring the establishment of a connection between the RN and the target base station.

Embodiment 6 of the present invention provides a communication system, including a relay node, a mobility management entity, a target base station, and a source base station. The target base station may be the base station in Embodiment 4, and is configured to implement the actions executed by the target base station in the RN handover method in Embodiments 1 to 3.

The source base station may be the base station in Embodiment 5, and is configured to implement the actions executed by the source base station in the RN handover method in Embodiments 1 to 3.

Therefore, in this embodiment, for a scenario in which an RN moves, the handover of the RN from the source base station to the target base station is implemented, thereby ensuring the establishment of a connection between the RN and the target base station.

A person skilled in the art may understand that the modules in the apparatus provided in the embodiment may be arranged in the apparatus in a distributed manner according to the description of the embodiment, or may be arranged in one or more apparatuses which are different from what is described in the embodiment. In addition, the modules in the embodiment may be combined into one module, or may be further split into multiple submodules.

A person skilled in the art may understand that the modules of the apparatus in the embodiment of the present invention are divided by functions, and in practice, the functional modules may be separated or combined to obtain the specific structure.

The sequence numbers of the above embodiments are merely for description, and do not imply the preference among the embodiments.

The technical solutions disclosed in the claims also fall within the protection scope of the embodiments of the present invention.

The foregoing embodiments are merely intended for describing the technical solutions of the present invention other than limiting the present invention. Although the present invention is described in detail with reference to the foregoing embodiments, persons of ordinary skill in the art should understand that they can still make modifications to the technical solutions described in the above embodiments or make equivalent substitutions to some technical features thereof, and such modifications or substitutions cannot make the essence of the corresponding technical solutions depart from the scope of the technical solutions of the embodiments of the present invention.

The invention claimed is:

1. A relay node handover method, comprising:
receiving, by a target base station, a handover request sent by a source base station serving a relay node;
acquiring, by the target base station, first transport network layer (TNL) information from the source base station; and
establishing, by the target base station, a connection with the relay node, where the connection is completed using information in the first TNL information, which includes at least one of (a) information for establishing a stream control transmission protocol (SCTP) association between the target base station and the relay node and (b) information for establishing a user plane connection.

2. The method according to claim 1, wherein
the information for establishing the SCTP association comprises first stream control transmission protocol (SCTP) association information, and the information for establishing the user plane connection comprises first user plane transport address information.

3. The method according to claim 2, wherein: when the first TNL information comprises the first SCTP association information, the first SCTP association information comprises at least one type of the following information:
a transport address list of a control plane of the relay node;
a transport address list of a control plane of the source base station; and
an address of a first primary path between the relay node and the source base station.

4. The method according to claim 2, wherein the establishing, by the target base station, the connection with the relay node according to the first TNL information, comprises:
transferring, by the target base station, based on the first SCTP association information, a first primary path between the source base station and the relay node to a path between the target base station and the relay node, to enable the target base station to be connected to the relay node through the first primary path.

5. The method according to claim 1, further comprising:
sending, by the target base station, second TNL information to the source base station according to the first TNL information, wherein the second TNL information comprises at least one of the following: (a) second stream control transmission protocol (SCTP) association information, and (b) second user plane transport address information.

6. The method according to claim 5, wherein, the sending, by the target base station, the second TNL information to the source base station according to the first TNL connection state information, comprises:

sending, by the target base station, the second TNL information to the source base station if the target base station confirms, according to the first TNL information, that at least one of the following situations exists: (a) at least one control plane transport address of the source base station and the relay node is unavailable, and (b) that at least one user plane transport address of the source base station and the relay node is unavailable.

7. The method according to claim 6, wherein the sending, by the target base station, the second TNL information to the source base station according to the first TNL connection state information comprises:

configuring, by the target base station, the second SCTP association information according to the first SCTP association information, and sending the second SCTP association information to the source base station if the target base station confirms that the at least one control plane transport address of the source base station and the relay node is unavailable, when the first TNL information comprises the first SCTP association information.

8. The method according to claim 5, wherein the second SCTP association information comprises at least one type of the following information:

a transport address list of a control plane of the relay node;
a transport address list of a control plane of the source base station;
a transport address list of a control plane of the target base station; and
an address of a second primary path between the relay node and the source base station.

9. The method according to claim 5, further comprising:
receiving, by the target base station, third TNL information, which is sent by the source base station according to the second TNL information, wherein the third TNL information comprises at least one of (a) third SCTP association information, and (b) the second user plane transport address information.

10. The method according to claim 9, wherein:
the third SCTP association information is confirmed by the source base station, and comprises at least one of the following information:
a transport address list of a control plane of the relay node;
a transport address list of a control plane of the source base station; and
an address of a second primary path between the relay node and the source base station.

11. The method according to claim 9, wherein when the third TNL information comprises the third SCTP association information, the establishing, by the target base station, the connection with the relay node according to the first TNL information, comprises:

transferring, by the target base station, based on the third SCTP association information, a second primary path between the source base station and the relay node to a path between the target base station and the relay node; and
connecting to the relay node through the second primary path.

12. The method according to claim 5, wherein the establishing, by the target base station, the connection with the relay node according to the first TNL information, comprises:

connecting, by the target base station, the target base station and the relay node based on the second user plane transport address information, when the first TNL information comprises the first user plane transport address information, and both the second TNL information and the third TNL information comprise the second user plane transport address information.

13. The method according to claim 5, wherein:
the first user plane transport address information is at least one of the following: (a) user plane transport address information of the source base station, and (b) user plane transport address information of the relay node, wherein the first user plane transport address information is sent by the source base station to the target base station; and
the second user plane transport address information is at least one of the following: (a) user plane transport address information of the source base station and (b) user plane transport address information of the relay node, wherein the second user plane transport address information is configured by the target base station and is confirmed by the source base station.

14. The method according to claim 1, wherein before establishing at least one of the SCTP association and the user plane connection, the method further comprises:

performing, by the target base station, configuration at a target base station side based on the first TNL information; and
wherein the configuration at the target side is a configuration of a data structure on a protocol stack SCTP performed according to SCTP association information at the target base station side.

15. The method according to claim 1, wherein the SCTP association refers to a logic connection or path between two SCTP endpoints for data transmission established through a four-step handshake mechanism made by an SCTP protocol.

16. A base station, comprising:
a processor, configured to decide to handover a relay node served by the base station to a target base station; and
a transmitter, configured to send a handover request and first transport network layer (TNL) information to the target base station, so that the target base station establishes a connection with the relay node, where the connection is completed using information in the first TNL information, which includes at least one of (a) information for establishing a stream control transmission protocol (SCTP) association between the target base station and the relay node and (b) information for establishing a user plane connection.

17. The base station according to claim 16, wherein:
the information for establishing the SCTP association comprises (a) first stream control transmission protocol (SCTP) association information, and the information for establishing the user plane connection comprises first user plane transport address information.

18. The base station according to claim 17, wherein:
the first SCTP association information comprises at least one type of the following information:
a transport address list of a control plane of the relay node;
a transport address list of a control plane of the base station; and
an address of a first primary path of the relay node and the base station.

19. The base station according to claim 16, further comprising:

a receiver, configured to: when the target base station confirms that at least one of the following: (a) at least one control plane transport address of a control plane transport address of the base station and a control plane transport address of the relay node is unavailable, and (b) at least one user plane transport address of a user plane transport address of the base station and a user plane transport address of the relay node is unavailable, receive second TNL information which is sent by the target base station to the base station according to the first TNL information, wherein the second TNL information comprises at least one of the following: (a) second stream control transmission protocol (SCTP) association information, and (b) second user plane transport address information configured by the target base station; and the transmitter, further configured to send third TNL information to the target base station according to the second TNL information, wherein the third TNL information comprises at least one of the following: (a) third SCTP association information, and (b) the second user plane transport address information confirmed by the base station.

20. A base station, comprising:

a receiver, configured to receive a handover request sent by a source base station serving a relay node and first transport network layer (TNL) information; and a processor, configured to establish a connection with the relay nod, where the connection is completed using information in the first TNL information, which includes at least one of (a) information for establishing a stream control transmission protocol (SCTP) association between the target base station and the relay node and (b) information for establishing a user plane connection.

21. The base station according to claim 20, wherein the information for establishing the SCTP association comprises first stream control transmission protocol (SCTP) association information, and the information for establishing the user plane connection comprises first user plane transport address information, wherein the first SCTP association information comprises at least one type of the following:

a transport address list of a control plane of the relay node;

a transport address list of a control plane of the source base station; and an address of a primary path of the relay node and the source base station.

22. The base station according to claim 20, wherein:

when at least one of the following situation exists: (a) at least one control plane transport address of a control plane transport address of the source base station and a control plane transport address of the relay node is unavailable, and (b) at least one user plane transport address of a user plane transport address of the source base station and a user plane transport address of the relay node is unavailable, the processor is configured to configure second TNL information, and the second TNL information comprises at least one of the following: (a) second stream control transmission protocol (SCTP) association information, and (b) second user plane transport address information; and the base station further comprises a transmitter, configured to send the second TNL information to the source base station.

* * * * *